United States Patent
Seki et al.

(10) Patent No.: US 7,031,231 B2
(45) Date of Patent: Apr. 18, 2006

(54) DISK HOLDER POP-OUT PREVENTING DEVICE

(75) Inventors: Kouji Seki, Tokyo (JP); Sadamu Matsuda, Tokyo (JP); Yukio Komazaki, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 346 days.

(21) Appl. No.: 10/276,459

(22) PCT Filed: May 18, 2001

(86) PCT No.: PCT/JP01/04148

§ 371 (c)(1),
(2), (4) Date: May 5, 2003

(87) PCT Pub. No.: WO01/88913

PCT Pub. Date: Nov. 22, 2001

(65) Prior Publication Data

US 2003/0165089 A1 Sep. 4, 2003

(30) Foreign Application Priority Data

May 19, 2000 (JP) ............................ 2000-148559

(51) Int. Cl.
*G11B 17/26* (2006.01)
(52) U.S. Cl. .............................. 369/30.77; 369/30.83; 369/30.84; 369/30.85
(58) Field of Classification Search ............ 369/30.77, 369/30.78, 30.83, 30.84, 30.69, 30.54, 30.53, 369/30.66, 30.67, 30.68, 30.85
See application file for complete search history.

(56) References Cited

U.S. PATENT DOCUMENTS

| 5,280,463 | A | * | 1/1994 | Okajima et al. | 369/30.84 |
| 5,907,531 | A | * | 5/1999 | Fujita et al. | 369/30.84 |
| 5,930,223 | A | * | 7/1999 | Toyama et al. | 369/30.84 |
| 5,959,950 | A | * | 9/1999 | Yamashita et al. | 369/30.83 |
| 6,122,244 | A | * | 9/2000 | Kikuchi | 369/30.84 |
| 6,188,664 | B1 | * | 2/2001 | Nakayama | 369/30.84 |
| 2004/0027934 | A1 | * | 2/2004 | Togashi et al. | 369/30.84 |

FOREIGN PATENT DOCUMENTS

| EP | 0856842 A2 | * | 8/1998 |
| JP | 08017126 A | * | 1/1996 |
| JP | 2001052416 A1 | * | 2/2001 |

* cited by examiner

*Primary Examiner*—Brian E. Miller

(57) ABSTRACT

A disk holder springing-out prevention device is constituted by utilizing an existing loading block LB. A disk holder 3 is restricted to an accommodated position within a magazine M by means of a stopper 1a provided on a holder guide rail 1. In general, the initial position of the loading block LB is adapted to be a raised/lowered position corresponding to the uppermost disk holder 3 and the stopper 1a is adapted to be superimposed in the vertical direction with an engagement projection 2a of a holder extracting member 2 when the holder extracting member 2 is in the initial position in the feed direction. In this way, positional restriction of the uppermost disk holder 3 is effected by the holder extracting member 2 whereas the stopper 1a performs positional restriction of the remaining disk holders 3. As a result, springing out of the disk holders 3 from the magazine M can be reliably prevented.

6 Claims, 3 Drawing Sheets

DISK HOLDER POP-OUT PREVENTING DEVICE

TECHNICAL FIELD

The present invention relates to a magazine-type disk change device and in particular relates to a disk holder springing-out prevention device for preventing springing out of disk holders from the magazine.

BACKGROUND ART

Conventionally, in disk players of the type in which an optical disk signal is read, such as a CD player or DVD player, in order to perform continuous playing of a plurality of disks in a smooth fashion, a magazine is employed that accommodates a plurality of disks, a disk change device being employed of a type in which disks are selectively extracted from within this magazine and played back continuously.

Using such a magazine type disk change device, when continuous playback of a plurality of disks is to be performed, continuous playback in smooth fashion whilst automatically changing a plurality of disks in a short time can be achieved by designating the next disk to be played back using input means such as a control button or by programming beforehand the sequence of a plurality of disks that are to be played back. If this is done, an excellent feeling in use can be obtained since the time required for disk changing is greatly reduced compared with disk change involving a manual operation, because such disk change does not require the performance of a manual operation.

In some magazine type disk change devices as described above, in particular small-sized disk change devices for in-vehicle use or the like, a magazine accommodating a plurality of disks in stacked fashion is arranged such that the surfaces of the disks are in the horizontal direction and is constituted such that the disk drive and disk feed section can be raised and lowered with respect to the magazine. In a disk change device of this type, when disk changing is performed, specifically the following series of operations is performed.

First of all, a disk that has been played is released from the turntable and held in or placed on a corresponding disk holder (clamp-release action). This is followed by return of the disk held in the disk holder to its accommodated position in the magazine, by return of this disk holder into the magazine (unloading action).

After this, the disk drive and disk feed section are raised or lowered and located in position (raising/lowering action) in accordance with the height of the disk holder holding the next disk to be played back. Next, a disk is moved to a prescribed position on the turntable (loading action) by extracting this disk holder from the magazine. Next, when the disk has reached the prescribed position, it is held on the turntable and released from the disk holder (clamping action).

Usually, in order to prevent the plurality of disk holders that are accommodated in stacked fashion in the magazine from springing out from the position in which they are accommodated in the magazine, they are fixed in their accommodated position by a spring. A holder fixing device using such springs has been considered wherein the disk holders 3 are fixed in the accommodated position by engagement of an engagement projection 11 of arrow (diamond) shape provided at one end of disk holders 3 as shown for example in the upper left part of FIG. 2 and a substantially C-shaped holder engagement spring 12 provided along the shape of the engagement projection 11 on the side of the main body of the magazine M.

However, the conventional magazine type disk change device described above is subject to the following problems.

That is, although, as described above, normally, a holder fixing device is provided whereby the holders are fixed in the accommodating position using springs, such as by engagement of an engagement projection 11 and a holder engagement spring 12 as shown in FIG. 2, even though such a holder fixing device is provided, there is a possibility that, when subjected to external impacts, the disk holders may spring out of the magazine.

In particular, although a disk change device for use in a car is held in a magazine-mounted condition in order to reduce as far as possible the space which it occupies during transportation and storage prior to mounting in the vehicle, there is a possibility that, during such transportation and storage, the disk holders may spring out from the magazine due to external impacts. This situation is described below.

Specifically, normally, during disk playback after mounting in the vehicle, the disk change device for a car is supported with the main body of the device in a floating condition from the case or escutcheon and so can be substantially cut off from external impacts. There is therefore scarcely any possibility of severe impacts being applied to the main body of the device during disk playback, so the probability of springing out of the disk holders occurring is extremely low.

In contrast, during transportation and storage prior to mounting in the vehicle, the main body of the device is frequently fixed to the case or escutcheon in order to prevent deterioration of the floating construction portion. External impacts are therefore directly applied to the main device body and there is therefore a possibility of the disk holders springing out from the magazine.

In order to prevent such springing out of the disk holders, consideration has been given to providing a disk springing-out prevention device in the main body of the disk change device. However, provision of a special purpose device for preventing springing out of the disk holders increases the number of components of the disk change device as a whole and so may result in the device as a whole becoming larger and more complicated. This is therefore undesirable.

The present invention was made with a view to solving the above problems of the prior art. An object thereof is to provide a disk holder springing-out prevention device of high operational reliability which is capable of contributing to miniaturization and simplification of the disk change device as a whole, by making it possible to reliably prevent springing out of the disk holders from within the magazine without increasing the number of components, by utilizing an existing structure of the disk change device.

DISCLOSURE OF THE INVENTION

In order to solve the aforementioned problem, the present invention aims to make it possible to reliably prevent springing out of the disk holders from the magazine without increasing the number of components, by conferring a disk holder springing-out prevention function on a disk feed section of a disk change device.

A disk holder springing-out prevention device according to the present invention is provided on a disk change device of the magazine type having a certain construction. This disk change device is constituted so as to effect positional alignment of a disk feed section with one of the plurality of raised/lowered positions respectively corresponding to the plurality of selection positions and the plurality of disk holders by raising/lowering of a disk feed section by horizontal movement of a sliding plate between a plurality of selection positions whereby one of a plurality of disk holders that are accommodated in stacked fashion within a magazine is selected. The arrangement is such that a disk holder is extracted by the disk feed section after positional alignment has been effected and the disk that is held therein is fed to a playback position on a turntable.

In a disk holder springing-out prevention device provided for preventing springing out of disk holders from the magazine in a disk change device of the magazine type having a construction as above, a disk holder springing-out prevention device according to the present invention has the following characteristic features.

First of all, in this disk holder springing-out prevention device, a holder extracting member that engages with a disk holder corresponding to one of said plurality of raised/lowered positions when the disk feed section is the one raised/lowered position, a holder guide member for guiding the edge of a disk holder when the disk holder is extracted, and a stopper that is provided on said holder guide member and that restricts the disk holder to an accommodated position in the magazine is provided. Of these, the stopper is a member adapted in such a manner that, when the disk feed section is in an initial position, it restricts at least one or more disk holders to accommodated positions within the magazine and when the disk feed section is in one of the plurality of raised/lowered positions, it makes possible extraction of at least one or more disk holders, including the disk holder corresponding to the one raised/lowered position. The stopper is adapted to be superimposed in a vertical direction with a disk holder engagement section of said holder extracting member when the holder extracting member is in the initial position in the disk feed direction. Also, the sliding plate is adapted in such a manner that the sliding plate performs ejection of the magazine in the vicinity of an initial position thereof.

With such a disk holder springing-out prevention device, when the disk feed section is in the initial position, the disk holder can be restrained to an accommodated position within the magazine by the stopper provided on the holder guide member of the disk feed section.

In this case, simply by providing the stopper as an extension of an existing structural member constituting the disk feed section i.e. the holder guide member, the holder guide member can be given a disk springing-out prevention function in addition to its original function i.e. of guiding a disk holder during disk feed,. Increase in the number of components of the disk change device as a whole can thereby be avoided, since it is unnecessary to provide a special-purpose member for preventing disk springing-out.

Also, there is no possibility of interfering with the extraction of the disk holder when a disk holder that has thus been restrained is extracted, since the stopper can be automatically shifted to the release position when the disk feed section attains the raised/lowered position corresponding to this disk holder.

In particular, since a stopper is provided so as to be superimposed with the disk holder engagement section of the holder extracting member on the holder guide member adjacent to the holder extracting member, a disk holder springing-out prevention device can be constituted by directly utilizing the existing engagement relationship provided between the disk holder and the holder extracting member. In this way, not only is it possible to reduce the stopper further in size but also its design is facilitated. Also, in the raising/lowering action of the disk feed section the holder extracting member and holder guide member are integrally raised/lowered, maintaining the vertically superimposed positional relationship of the holder extracting member and holder guide member. There is therefore no possibility of the stopper interfering with the extraction of the disk holder.

Furthermore, ejection of the magazine is automatically performed simply by moving the sliding plate somewhat from its initial position. Shifting between magazine ejection and the initial condition can therefore be performed in a short time.

A disk holder springing-out prevention device according to one embodiment of the present invention is adapted such that positional restriction of one disk holder is performed by the holder extracting member rather than by the stopper. Specifically, the disk feed section is adapted such that one of said plurality of raised/lowered positions is the initial position. Also, the stopper is adapted to restrict the disk holders, other than the disk holder engaged by the holder extracting member, to accommodated positions within the magazine when the disk feed section is in the initial position.

With this disk holder springing-out prevention device, by performing positional restraint of one disk holder by the holder extracting member, which is an existing member, the number of disk holders that are restrained in position by the stopper can be reduced by one, so the size of the stopper can be reduced to that extent.

Furthermore, if positional restriction of one disk holder is performed by the holder extracting member in this way, preferably the initial position of the disk feed section is either the uppermost or lowermost raised/lowered position, of the plurality of raised/lowered positions. In this case, by positional restriction of the disk holder positioned on the uppermost or lowermost level by the holder extracting member, the portion of the stopper corresponding to the disk holder portion at this uppermost or lowermost level can be eliminated.

In a disk holder springing-out prevention device according to one embodiment of the present invention, a stopper is provided on a holder guide member that guides the disk holder. Specifically, the disk feed section comprises a holder guide member for guiding the edge of a disk holder when a disk holder is being extracted. The stopper is provided on the holder guide member and is adapted to be superimposed in the vertical direction with the disk holder engagement section of said holder extracting member when the holder extracting member is in the initial position in the disk feed direction.

In such a disk holder springing-out prevention device, since a stopper is provided so as to be superimposed with the disk holder engagement section of the holder extracting member on the holder guide member adjacent to the holder extracting member, a disk holder springing-out prevention device can be constituted by directly utilizing the existing engagement relationship provided between the disk holder and the holder extracting member. In this way, not only is it possible to reduce the stopper further in size but also its design is facilitated.

In a disk holder springing-out prevention device according to one embodiment of the present invention, the initial position of the disk feed section is the uppermost raised/lowered position, the initial position of the sliding plate is the uppermost selection position wherein the uppermost disk holder is selected and the sliding plate is arranged to perform ejection of the magazine in a position adjacent to the uppermost selection position. Specifically, the sliding plate is adapted to be capable of horizontal movement in a selection range whereof the two ends are the lowermost selection position in which the lowermost disk holder is selected and the uppermost selection position in which the uppermost disk holder is selected and further capable of horizontal movement from the uppermost selection position, which is the initial position, to an outside position outside the selection range. The sliding plate is adapted such that ejection of the magazine is performed at this outside position.

With this disk holder springing-out prevention device, ejection of the magazine is automatically performed simply by moving the sliding plate somewhat from the uppermost selection position, which is its initial position, to the outside position. During ejection of this magazine, the loading block is held in the uppermost raised/lowered position, which is the initial position. Shifting between magazine ejection and the initial condition can therefore be performed in the minimum time without performing a raising/lowering operation of the loading block.

BEST MODE FOR CARRYING OUT THE INVENTION

An embodiment wherein a disk holder springing-out prevention device according to the present invention is applied to a CD disk change device for mounting in a car is described in detail below with reference to the drawings.

1. Construction

Figure 1:
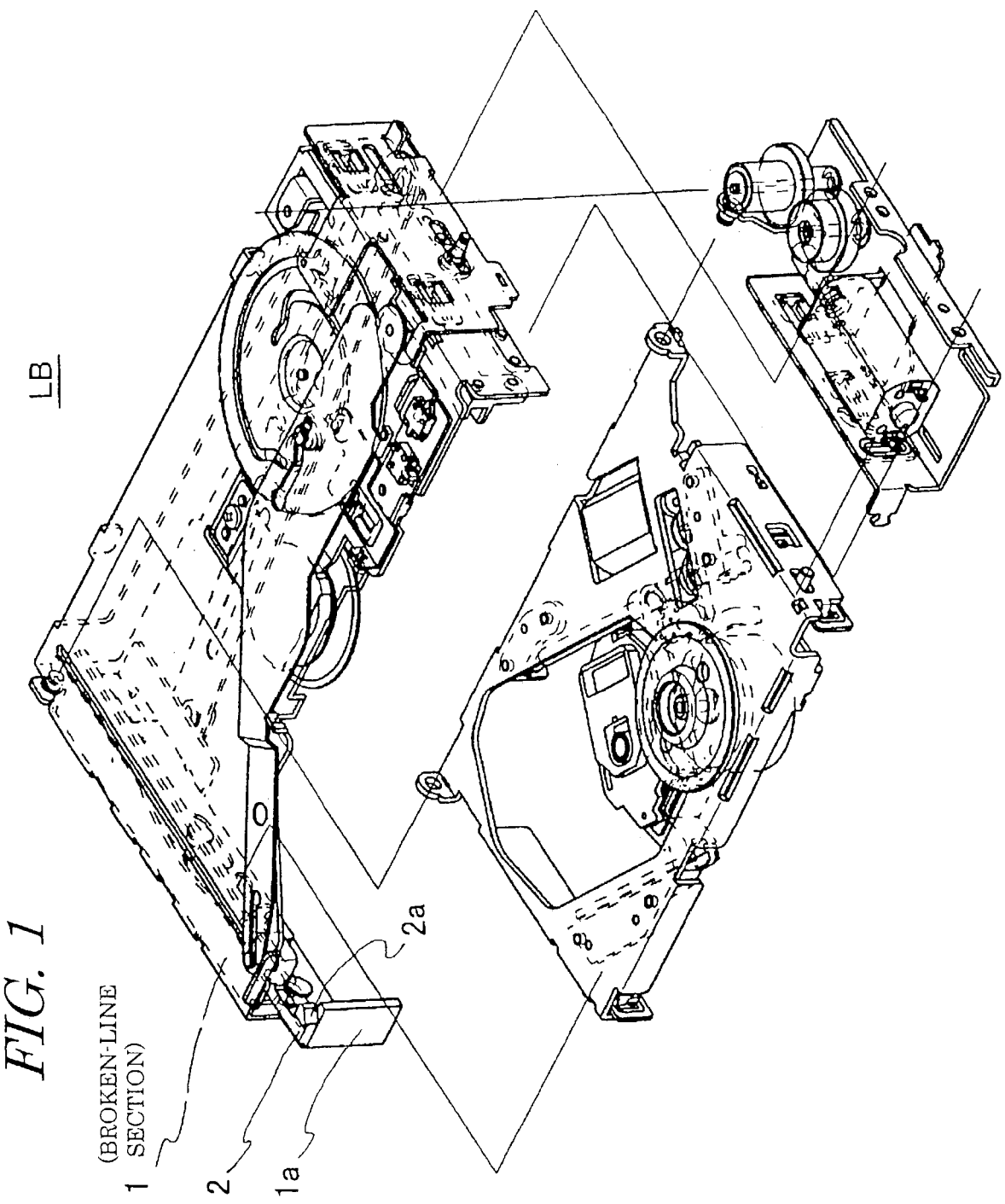
FIG. 1 is an exploded perspective view illustrating a loading block of a disk change device comprising a disk holder springing-out prevention device according to an embodiment wherein the present invention is applied.
Figure 2:
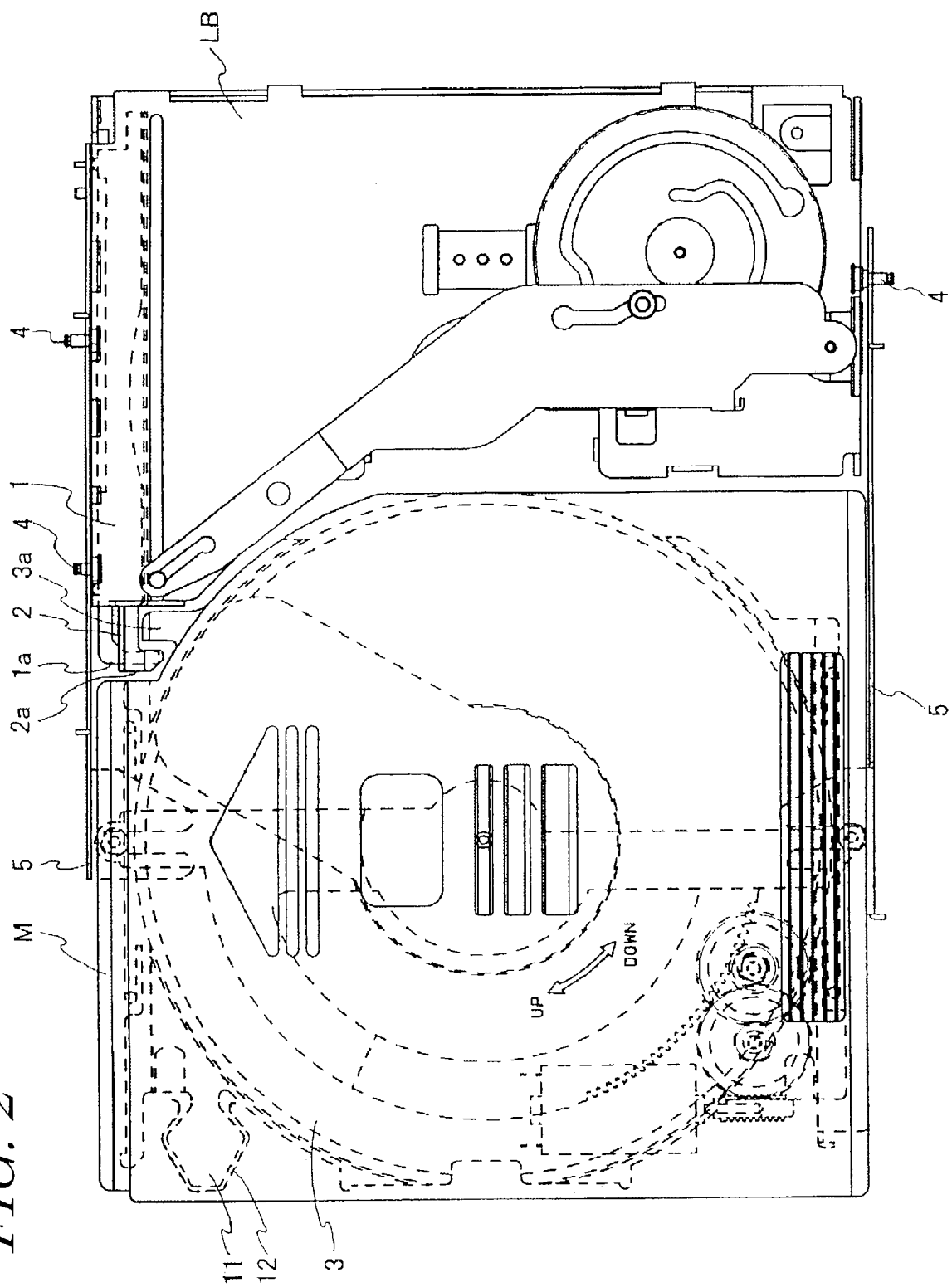
FIG. 2 is a plan view illustrating the initial condition in which a magazine is mounted in the disk change device illustrated in FIG. 1.
Figure 3:
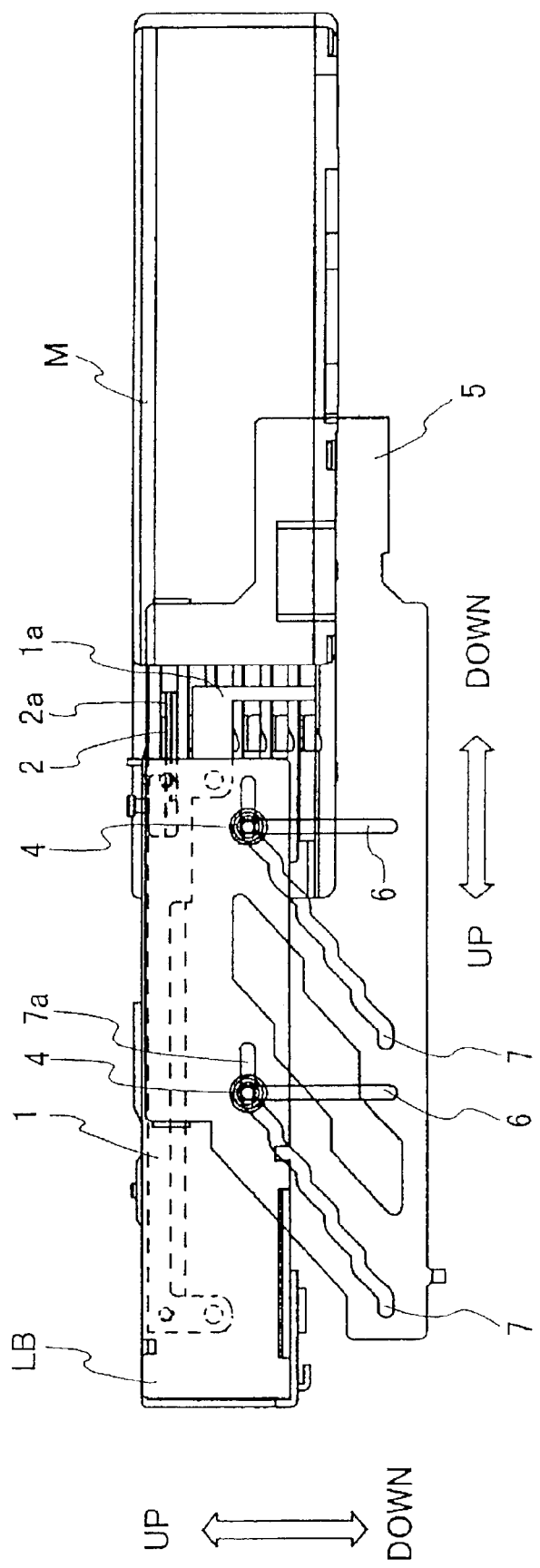
FIG. 3 is a side view of FIG. 2.

First of all, the construction of this embodiment will be described with reference to FIG. 1 to FIG. 3. FIG. 1 is an exploded perspective view illustrating a loading block (disk feed section) of a disk change device comprising a disk holder springing-out prevention device according to an embodiment wherein the present invention is applied. FIG. 2 and FIG. 3 are a plan view and a side view illustrating a loading block and a magazine in the initial condition.

In FIG. 1 to FIG. 3 a large number of members are illustrated constituting a loading block but since the loading block itself is not the subject of the present invention hereinbelow only the construction of the disk holder springing-out prevention device will be described.

First of all, as shown in FIG. 1 to FIG. 3, in this embodiment, in an existing loading block (disk feed section) LB having a holder guide rail 1 and holder extracting member 2 adjacently arranged on the inside of a side wall on one side thereof, a disk holder springing-out prevention device is constituted utilizing the raising/lowering action of the holder guide rail 1 and the holder extracting member 2 accompanying the raising/lowering action of the loading block LB. Specifically, in the disk holder springing-out prevention device according to the present embodiment, it is assumed that the loading block LB is made to perform a specific raising/lowering action, so, hereinbelow, the construction utilizing the holder guide rail 1 and holder extracting member 2 will be described after describing set-up of the raising/lowering action of such a loading block LB.

The loading block LB serves to perform positional alignment with one of a plurality of raising/lowering positions respectively corresponding to a plurality of disk holders 3 stacked in the magazine M. FIG. 3 shows the case where a magazine M is employed in which, as an example, six disk holders 3 are accommodated in stacked fashion.

The raising/lowering drive and control of the loading block LB is performed by vertical drive control by horizontal movement of a sliding plate 5 of a shift pin 4 provided on both the left and right sides thereof, as shown in FIG. 2. Specifically, as shown in FIG. 3, the shift pin 4 is inserted into a vertical guide hole 6 provided in a chassis, not shown, and is inserted into a cam hole 7 of stepped shape provided in the sliding plate 5; thus, it is capable of being raised and lowered along the vertical guide hole 6 and is subjected to drive control to positions corresponding to the various levels of the cam hole 7.

Thus, by respectively stopping the sliding plate 5 in a selected position of each level by horizontal movement within the selection range from the selection position of the disk holder 3 at the uppermost level as shown in FIG. 3 to the selection position of the disk holder 3 at the lowermost level, not shown, the loading block LB is located in the corresponding raised/lowered position. Specifically, when the sliding plate 5 is in the uppermost selected position as shown in FIG. 3, the shift pin 4 is at the uppermost level of the stepped cam hole 7 and the loading block LB is in the uppermost raised/lowered position. Also, when the sliding plate 5 is in the selection position of the lowermost level, the shift pin 4 is at the lowermost level of the stepped cam hole 7 and the loading block LB is in the lowermost-level raised/lowered position. It should be noted that, in this embodiment, the initial position of the loading block LB is set in the uppermost raised/lowered position as shown in FIG. 3. Consequently, the initial position of the sliding plate 5 is the uppermost selection position as shown in FIG. 3.

Also, the sliding plate 5 is capable of horizontal movement, not merely horizontal movement within the selection range from the uppermost selection position to the lowermost-level selection position, but, further, from the uppermost selection position, which is the initial position, to an outside position outside the selection range. Specifically, as shown in FIG. 3, an extension portion 7a is provided in the uppermost level of the cam hole 7; the sliding plate 5, by moving further to the left in the Figure from the uppermost selection position shown in FIG. 3, can thus move to an outside position in which the shift pin 4 of the loading block LB enters the extension portion 7a of the cam hole 7.

The sliding plate 5 is constructed such as to perform ejection of the magazine M in this outside position. That is, whereas, typically, in a magazine type disk change device, magazine locking means is provided that locks the magazine M, the construction is such that locking of the magazine M can be automatically released by utilizing as a locking release member locking release by engagement of an arbitrary operating member within the device with this magazine locking means. In this embodiment, the sliding plate 5 is utilized as such a magazine locking release member. Existing techniques of various types may be employed as the magazine locking means. For example, the techniques disclosed in laid-open Japanese Patent Publication Number H. 8-17126 may be employed. However, since the magazine locking means itself is not the subject of the present invention, description thereof is omitted.

Also, as shown in FIG. 1 to FIG. 3, on the loading block LB, a holder guide rail 1 is provided, and is fixed on the loading block, so as to extend in the horizontal direction, being a holder guide member for guiding the edge of the disk holder 3 during the extraction of the disk holder 3. Also, the holder extracting member 2 is constructed so as to engage with this disk holder 3 when the loading block LB is in respective raised/lowered positions corresponding to the disk holders 3 in the magazine M.

In more detail, as shown in FIG. 2, an engagement projection 2a is provided at the tip of the holder extracting member 2 and an engagement projection 3a is provided at the opposite end of the disk holders 3, such that corresponding engagement projections 2a and 3a can engage with each other. Thus, by sliding operation of the holder extracting member 2 from the initial position shown in FIG. 2 and FIG. 3, a disk holder 3 is extracted from the magazine M by means of the engagement projections 2a, 3a and is fed to a loading-completed position on the loading block LB.

With a loading block LB according to this embodiment, in addition to such existing constructions as the guide rail 1 and the holder extracting member 2, a stopper 1a is provided at the end of the holder guide rail 1 nearest the magazine M. When the loading block LB is in the uppermost raised/lowered position, which is the initial position as shown in FIG. 3, this stopper 1a is arranged so as to restrict the disk holder 3 to the prescribed accommodated position within the magazine M.

In this case, in this embodiment, as shown in FIG. 2, of the plurality of disk holders 3 accommodated in stacked fashion within the magazine M, restriction of the position of the uppermost disk holder 3 is effected not by the stopper 1a but by the holder extracting member 2 but the 1a effects positional restriction of the remaining disk holders 3.

This positional restriction by both of the holder extracting member 2 and the stopper 1a is achieved by the fact that the initial position of the loading block LB is chosen as the uppermost raising/lowering position and by suitable arrangement of the stopper 1a, as will now be illustrated. Specifically, as shown in FIG. 3, the stopper 1a is arranged such that, when the holder extracting member 2 is in the initial position in the feed direction, it is superimposed in the vertical direction on the engagement projection of the holder extracting member 2 (disk holder engagement section) 2a.

Also, as described above, on the side of the magazine M, there is provided a holder fixing device that fixes the disk holders 3 in an accommodated position by engagement of the engagement projection 11 formed in the shape of an arrow (diamond shape) provided at one end of each disk holder 3 and a substantially C-shaped holder engagement spring 12 provided along the shape of the engagement projection 11 on the side of the main body of the magazine M.

2. Action and Effects

Next, the action and effects of a disk holder springing-out prevention device according to the present embodiment having the construction as above will be described.

First of all, in the initial condition as shown in FIG. 2 and FIG. 3, when the loading block LB is in the initial position i.e. the raised/lowered position on the highest level corresponding to the disk holder 3 on the highest level, the engagement projection 2a of the holder extracting member 2 which is in the initial position in the disk feeding direction and the engagement projection 3a of the disk holder 3 which is at the uppermost level are engaged. The disk holder 3 which is at the uppermost level is therefore restricted to a prescribed accommodation position within the magazine M by the holder extracting member 2. In this case, as shown in FIG. 2, the stopper 1a that is provided on the holder guide rail 1 is superimposed directly below the engagement projection 2a of the holder extracting member 2, so that the rest of the disk holders 3 apart from the one on the uppermost level are altogether restrained in the prescribed accommodated position within the magazine M.

Thus, with a disk holder springing-out prevention device according to this embodiment, when the loading block LB is in the initial position, all of the disk holders 3 can be restrained in the prescribed accommodated position within the magazine M by means of the stopper 1a of the holder guide rail 1 and the engagement projection 2a of the holder extracting member 2. Consequently, even if the holder engagement springs 12 are subjected to large impacts of a degree sufficient to cause them to separate from the engagement projections 11, springing out of the disk holders 3 from within the magazine M can be reliably prevented.

In particular, even when severe impacts are directly applied to the main body of the device from outside whilst the disk change device main body is fixed to the case or escutcheon during transportation and storage prior to installation in the vehicle, springing out of the disk holders 3 from the magazine M can be reliably prevented by the disk holder springing-out prevention device according to this embodiment. Higher operating reliability can therefore be ensured.

Also, in this embodiment, simply by extending the stopper 1a to the existing holder guide rail 1 of the loading block LB, in addition to the original function of the holder guide rail 1 i.e. of guiding the disk holders 3 during disk feed, this can be given a function of preventing the disk holders springing out. There is therefore no need to provide a special-purpose member for preventing the disk holder springing out, so there is no increase in the number of components of the disk change device overall. Since a disk holder springing-out prevention device can be constructed which is extremely compact, utilizing the existing structure of the disk change device, this therefore contributes to miniaturization and simplification of the disk change device as a whole.

Furthermore, thanks to positional restriction of the disk holder 3 on the uppermost level by means of the holder extracting member 2, the portion corresponding to the uppermost disk holder 3 portion of the stopper 1a can be eliminated. The stopper 1a can therefore be reduced in size by an amount corresponding to one level in comparison with the case where positional restriction of all of the disk holders 3 is performed by the stopper 1a.

When disk playback is commenced from the initial condition shown in FIG. 2 and FIG. 3 after installation of the disk change device main body in the vehicle, the loading block LB is raised/lowered by the raising/lowering drive block DB so that it is positionally aligned with the raised/lowered position corresponding to the disk holder 3 holding the disk in question. In this raising/lowering action, as shown in FIG. 2, the holder extracting member 2 and holder guide rail 1 are integrally raised/lowered, maintaining the vertically superimposed positional relationship of the engagement projection 2a and the stopper 1a. There is therefore no possibility of the stopper 1a interfering with the extraction of the disk holder 3.

Furthermore, in this embodiment, ejection of the magazine M is automatically effected simply by moving the sliding plate 5 from the uppermost selection position, which is the initial position shown in FIG. 3. On the ejection of this magazine M, the loading block LB is held in the uppermost raised/lowered position, which is the initial position shown in FIG. 3.

As a result, the movement from ejection of the magazine M to the initial condition shown in FIG. 3 can be effected in the shortest time without performing a raising/lowering action of the loading block LB. This makes it possible to perform ejection immediately when the ejection of the magazine M is performed with this mounted in the vehicle after the disk change device has been transported with the magazine in an installed condition. Also, even in the case of ordinary use of the disk change device after mounting in the vehicle, the magazine removal time and/or mounting time are shortened, making it possible to perform replacement of the disks or magazine in the minimum time.

3. Other Embodiments

It should be noted that the present invention is not restricted to the embodiments described above but can be put into practice in many other modified forms within the scope of the present invention. For example, the member where the stopper according to the present invention is provided is not restricted to being a holder guide rail and in fact the stopper can be provided on another structural member constituting the disk feed section.

Also, in cases where it is inconvenient to align the initial position of the disk feed section with the raised/lowered position corresponding to one of the disk holders, it is also possible to effect positional restriction of all of the disk holders solely by means of the stopper, without employing the holder extracting member. However, in general, it is desirable to align the initial position with the raised/lowered position corresponding to one of the disk holders. The reason for this is that in this case there are many advantages such as that it becomes unnecessary to raise/lower the disk feed section when the disk holder corresponding to the initial position is to be played back and also, even when replacing the magazine etc, it is possible to remove the magazine directly from the initial position without raising or lowering the disk feed section or, after installing a magazine, to bring about a condition in which disk playback is possible without raising or lowering the disk feed section.

Although, in the embodiments described above, as one example, the case was described in which a magazine M was employed in which six disk holders were accommodated in stacked fashion, the present invention can be applied in the same way to the employment of magazines of various types accommodating in stacked fashion any desired plurality of disk holders. In this case, the stroke of the raising/lowering action of the disk feed section and/or the stroke of the horizontal operation of the sliding plate corresponding thereto are changed in accordance with the number of disk holders accommodated in the magazine.

Although, in the above embodiments, the case was described in which a shift pin provided on the disk feed section was inserted into a cam hole of stepped shape provided in the sliding plate, the construction for the positional control of the disk feed section by the sliding plate is not restricted to this and can be freely altered so long as alignment of the disk feed section with one of the plurality of raised/lowered positions can be achieved by horizontal movement of the sliding plate. For example, a construction may be envisaged in which a cam pin provided on the sliding plate side is inserted into a stepped guide groove in the disk feed section.

Since the present invention relates to a disk holder springing-out prevention device, it is not restricted in any way to the construction of the disk change device itself in which this disk springing-out prevention device is provided and so can likewise be applied to disk changing devices having many types of construction, so long as these have a possibility of a disk holder springing out from within the magazine and likewise excellent effects may be obtained thereby.

INDUSTRIAL APPLICABILITY

As described above, with the present invention, by providing a stopper for disk holder springing out on a structural member of the disk feed section of the disk change device, springing out of disk holders from within the magazine can be reliably prevented without increasing the number of components. A disk holder springing-out prevention device of high operating reliability, capable of contributing to miniaturizing and simplifying the disk change device as a whole can therefore be provided by utilizing an existing structure of the disk change device.

The invention claimed is:

1. A disk holder springing-out prevention device provided for preventing a springing out of disk holders from a magazine in a disk change device of a magazine type that is constructed such that the device raises/lowers a disk feed section by horizontal movement of a sliding plate between a plurality of selection positions whereby one of a plurality of disk holders accommodated in a stacked fashion within a magazine is selected, the disk feed section is positioned at one of said plurality of raised/lowered positions respectively corresponding to said plurality of selected positions and said plurality of disk holders, a disk holder is extracted by the disk feed section and the disk that is held therein is fed to a playback position on a turntable, characterized in that said disk holder springing-out prevention device comprises:

a holder extracting member that engages with a disk holder corresponding to one of said plurality of raised/lowered positions when the disk feed section is in one of the plurality of raised/lowered positions, a holder guide member for guiding the edge of a disk holder when the disk holder is extracted, and a stopper that is provided on said holder guide member and adapted in such a manner that, when said disk feed section is in an initial position, the stopper restricts at least one or more disk holders to accommodated positions within the magazine and when the disk feed section is in one of said plurality of raised/lowered positions, the stopper makes possible the extraction of at least one or more disk holders, including the disk holder corresponding to the one of the plurality of raised/lowered positions, wherein said stopper is adapted to be superimposed in a vertical direction with a disk holder engagement section of said holder extracting member when the holder extracting member is in the initial position in the disk feed direction; and said sliding plate is adapted in such a manner that the sliding plate performs ejection of the magazine in the vicinity of an initial position thereof.

2. The disk holder springing-out prevention device according to claim 1 wherein:

said disk feed section is adapted such that one of said plurality of raised/lowered positions is the initial position; and said stopper is adapted to restrict disk holders other than the disk holder that is engaged by said holder extracting member to accommodated positions within the magazine when said disk feed section is in the initial position.

3. The disk holder springing-out prevention device according to claim 2, wherein said initial position of said disk feed section is either the uppermost or lowermost raised/lowered position of said plurality of raised/lowered positions.

4. The disk holder springing-out prevention device according to claim 1 wherein:

the initial position of said disk feed section is the uppermost raised/lowered position and the initial position of said sliding plate is the uppermost selection position in which the uppermost disk holder is selected; and said sliding plate is adapted to be capable of horizontal movement in a selection range defined between the lowermost selection position in which the lowermost disk holder is selected and the uppermost selection position in which the uppermost disk holder is selected and further capable of horizontal movement from the uppermost selection position, which is said initial position, to an outside position outside the selection range and is adapted such that ejection of the magazine is performed at this outside position.

5. The disk holder springing-out prevention device according to claim 2 wherein:

the initial position of said disk feed section is the uppermost raised/lowered position and the initial position of said sliding plate is the uppermost selection position in which the uppermost disk holder is selected; and said sliding plate is adapted to be capable of horizontal movement in a selection range defined between the lowermost selection position in which the lowermost disk holder is selected and the uppermost selection position in which the uppermost disk holder is selected and further capable of horizontal movement from the uppermost selection position, which is said initial position, to an outside position outside the selection range and is adapted such that ejection of the magazine is performed at this outside position.

6. The disk holder springing-out prevention device according to claim 3 wherein;

the initial position of said disk feed section is the uppermost raised/lowered position and the initial position of said sliding plate is the uppermost selection position in which the uppermost disk holder is selected; and said sliding plate is adapted to be capable of horizontal movement in a selection range defined between the lowermost selection position in which the lowermost disk holder is selected and the uppermost selection position in which the uppermost disk holder is selected and further capable of horizontal movement from the uppermost selection position, which is said initial position, to an outside position outside the selection range and is adapted such that ejection of the magazine is performed at this outside position.

* * * * *